United States Patent

[11] 3,631,362

[72] Inventors Joseph C. Almasi;
William S. Martin, both of Schenectady, N.Y.
[21] Appl. No. 755,652
[22] Filed Aug. 27, 1968
[45] Patented Dec. 28, 1971
[73] Assignee General Electric Company

[54] FACE-PUMPED, FACE-COOLED LASER DEVICE
8 Claims, 3 Drawing Figs.

[52] U.S. Cl. .................................................... 331/94.5
[51] Int. Cl. .................................................... H01s 3/00
[50] Field of Search ...................................... 331/94.5

[56] References Cited
UNITED STATES PATENTS
3,424,991 1/1969 Martin .......................... 331/94.5
3,431,511 3/1969 Fyler ............................ 331/94.5
3,466,569 9/1969 Chernoch ...................... 331/94.5
3,487,330 12/1969 Gudmundsen ................. 331/94.5

Primary Examiner—Ronald L. Wibert
Assistant Examiner—V. P. McGraw
Attorneys—John F. Ahern, Paul A. Frank, Julius J. Zaskalicky, Frank L. Neuhauser, Oscar B. Waddell and Louis A. Moucha ABSTRACT: A face-pumped laser device utilizes one or more thin planar laser elements which have major surfaces thereof in physical contact with a flowing coolant having an index of refraction near that of the laser elements. The arrangement allows increased pulse repetition rates while also maintaining uniform optical properties and relaxing wavelength tolerance requirements of the laser elements.

INVENTORS
JOSEPH C. ALMASI
WILLIAM S. MARTIN, by Paul A. Franke
THEIR ATTORNEY

INVENTORS:
JOSEPH C. ALMASI
WILLIAM S. MARTIN, by Paul G. Frank

THEIR ATTORNEY

FACE-PUMPED, FACE-COOLED LASER DEVICE

The present invention relates to a pulsed laser device capable of an increased repetition rate, and more particularly, to a face-pumped, face-cooled laser device wherein thermal conductivity effects and surface tolerance requirements are diminished.

The present application is related to copending applications of J. P. Chernoch and H. R. Koenig, Ser. No. 315,054, filed Oct. 9, 1963, now U.S. Pat. No. 3,423,693; application Ser. No. 467,941 of K. Tomiyasu and J. C. Almasi, filed June 29, 1965, now Pat. No. 3,500,231; application Ser. No. 615,673 of W. S. Martin, filed Feb. 13, 1967, now U.S. Pat. No. 3,424,991; and application Ser. No. 644,142 of J. P. Chernoch and W. S. Martin, filed June 7, 1967, all of which are assigned to the present assignee.

It is now well known in the art that laser devices emit electromagnetic radiation of wavelengths generally in the infrared and visible portions of the electromagnetic spectrum. The radiation emission is substantially coherent and is characterized by a narrow wavelength band.

Laser devices are operable using a suitable medium in which a population inversion may be established in a particular metastable energy level by proper "pumping." Neodymium glass, ruby, helium-neon, and carbon dioxide are media which are commonly employed. By "pumping" or irradiating the active medium with radiation possessing power necessary to create the population inversion, conditions permitting coherent emission may be obtained. The means emitting the radiation causing inversion is called the "pumping mean" while the wavelength of the radiation is known as the "pumping wavelength."

Laser devices which emit high energy pulses are well known in the art as "pulsed lasers." The emitted pulses, though high in energy, are short in duration, lasting on the order of milliseconds to nanoseconds in duration.

The laser output is only a small percent of the input energy, a large percentage of the energy ending up as heat in the laser medium. In pulsed lasers, one or more surfaces of the active medium is cooled in order to extract the excess heat. Because of the limited thermal conductivity of the laser medium, the excess heat is more rapidly removed from near the surface than from the interior, causing the center of the medium to be warmer than the surface. Repeated operation of the laser medium, precluding a proper cooling period, causes a substantial thermal gradient to be established, resulting in possible structural failure or distortion of the output beam. Lasers employing materials characterized by low thermal conductivities are particularly limited to low pulse repetition rates.

Recent interest in high repetition rates of pulsed laser have led to increased activity in this field. Since a number of materials (particularly those of the doped glass species) which are popularly employed as the active laser media have low thermal conductivity, several approaches have been taken to overcome this restraint on pulse repetition rates. These approaches have in common the segmenting of the laser material and interspersing of a flowing coolant. The result of this procedure is that the unwanted heat is more quickly removed through the relatively smaller dimensions of the segmented laser material and therefore the composite arrangement can be operated at higher pulse repetition rates without structural failure due to thermally induced stress. In general, however, this technique has not proven to be entirely satisfactory since the problems of nonuniform heating and inversion across the device aperture remains, causing distortion of the laser output beam which in itself is undesirable and which may also result in structural damage.

Presently, "face-pumped" laser devices of the types discussed and claimed in the aforementioned related copending applications are advantageously employed as pulsed lasers. A face-pumped type of laser device permits substantially uniform activation and concomitant heating across the laser aperture in contrast to the nonuniform optical properties of the "side-pumped, rod-type" laser device. When, however, it is desired to substantially increase the pulse repetition rate of face-pumped laser devices, the problem of extracting the excess heat while maintaining the advantageous uniform optical properties arises. Increasing the repetition rate by decreasing the disk thickness lessens the amount of pumping energy absorbed and creates a corresponding difficulty in fabricating the face of the laser disk within flatness tolerance requirements.

Accordingly, an object of the present invention is to provide means for increasing the pulse repetition rate of a face-pumped laser while maintaining uniform optical properties across the aperture.

Another object of the present invention is to increase the pulse repetition rate of a face-pumped laser while relaxing the rigid flatness tolerances of the laser medium surface.

Briefly stated, in accord with one embodiment of the present invention, we provide a face-pumped pulsed laser device wherein the generated excess heat is removed uniformly across the laser aperture. The active laser medium comprises one or more thin planar elements. A cooling fluid having an index of refraction approximately the same as that of the laser elements is forced into physical contact with the major surfaces thereof making it possible to have a substantial increase in the pulse repetition rate.

The novel features believed characteristic of the present invention are set forth in the appended claims. The invention itself, together with further objects and advantages thereof, may best be understood with reference to the following description, taken in connection with the appended drawings in which:

In the following description of the device of our invention, neodymium-doped glass is discussed as the material which comprises the active laser medium. It is understood, however, that any active medium having physical characteristics similar to neodymium-doped glass and consistent with the operation of the laser device of our invention is serviceable herein as the active laser medium.

Figure 1:
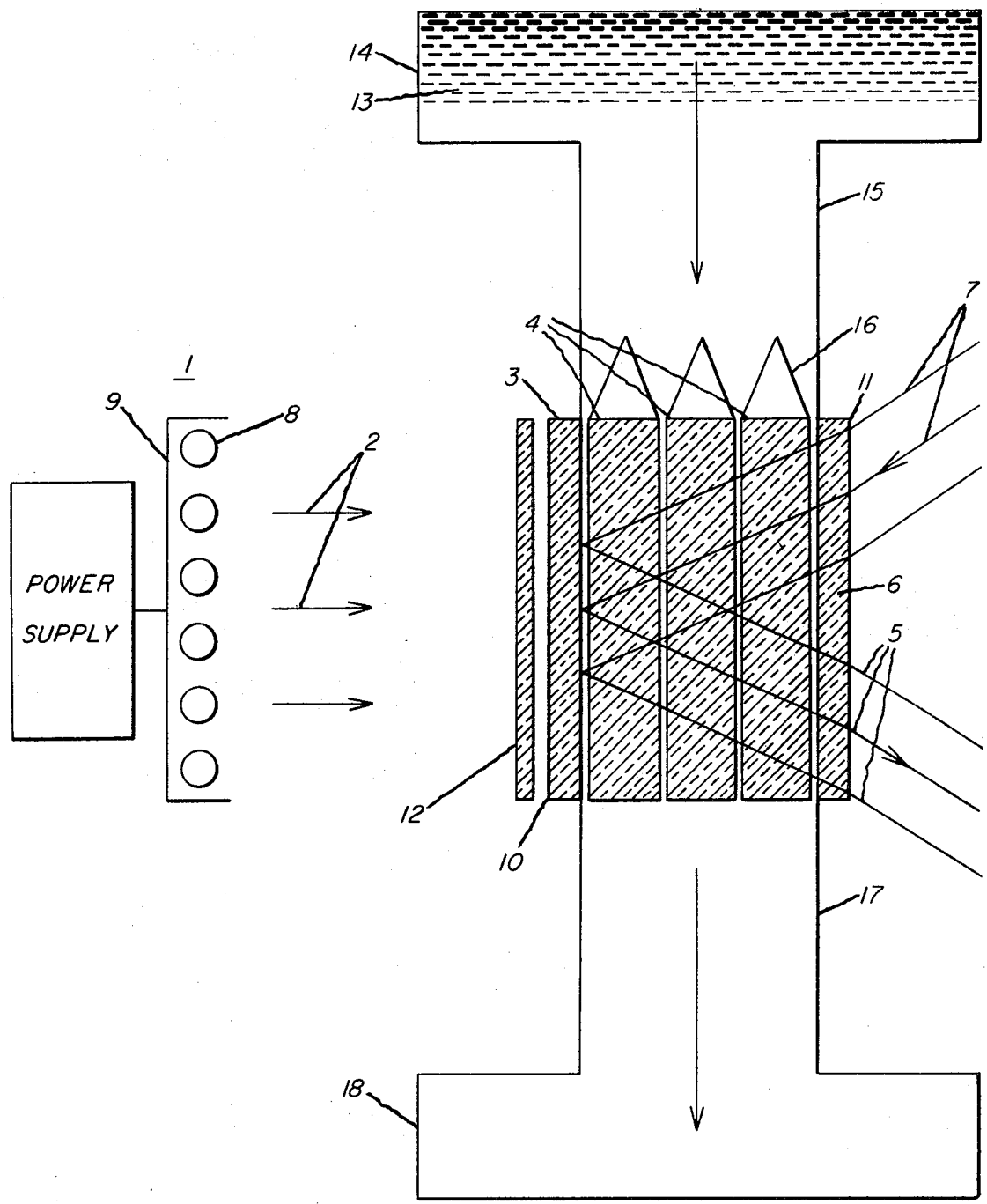
FIG. 1 is a view in vertical cross section of a face-pumped, face-cooled laser device constructed in accordance with our invention.

FIG. 1 illustrates a simplified face-pumped laser device wherein pumping means 1 supplies radiation 2 of pumping wavelengths which passes through optically transparent window 3 and is absorbed by a plurality of thin planar laser elements 4 comprising the active laser medium. The pumping wavelength causes population inversion in laser elements 4 which in turn emit coherent electromagnetic radiation 5 passing through window 6. It is readily understood, however, that, though the embodiment depicted in FIG. 1 has a plurality of laser elements 4, one laser element may be employed when desired in particular situations.

It is typical to employ a series of laser devices, each emitting coherent electromagnetic radiation of the same wavelength using the first of the series as a generator, and the remaining laser devices as amplifiers of laser beam input. The device of FIG. 1 is illustrated as amplifying incoming radiation 7 of laser emission wavelength emitted by another laser device (not shown).

Pumping means 1 used for face-pumping the laser device may conveniently comprise one or more flash lamps 8, for example, flash lamps of the xenon arc type. Lamps 8 mounted transversely across a housing (not shown), and in front of suitable reflector 9 made of a material such as alumina, are positioned to illuminate the major surfaces of laser elements 4 facing pumping means 1 with a pulse of high energy optical radiation 2 of pumping wavelength causing population inversion therein.

Windows 3 and 6 may be constructed of fused silica or any material which is optically transparent to the pumping wavelengths and to the coherent radiation emitted by the laser elements 4. Either major surface of window 3 may be coated with a coating 10 which is substantially totally reflecting at laser emission wavelengths. In FIG. 1, the major surface opposite laser elements 4 is shown coated with coating 10. When it is desired to utilize a laser device of the resonating type, a second coating 11 may be coated on the major surface of window 6 opposite planar elements 4. It is understood, however, that external mirrors may be employed as well to accomplish the same result. Coating 11 is partially reflecting to the emitted coherent radiation. The outside major surfaces of windows 3 and 6 opposite laser elements 4 are made optically flat to within one-tenth wavelength at a wavelength of 1.06 microns, the wavelength of coherent light emitted from a neodymium glass laser.

A suitable optical filter 12 may be positioned between pumping means 1 and window 3 to eliminate radiation of wavelengths outside of the range encompassed by pumping wavelength bands. For neodymium-doped glass, the pumping wavelengths are from approximately 5,000 to 9,000 Angstrom units.

The major surfaces of the thin planar laser elements 4 are closely positioned to and are substantially parallel with each other and the major surfaces of windows 3 and 6. Laser elements 4 may be comprised of neodymium glass, for example, that is commercially obtainable from American Optical Company under the number AOLUX-3835 and may be conveniently in a planarlike rectangular configuration of approximately 4 in. by 4 in. by 5 mm. Any thin planar configuration, however, is suitable for use in the described pulsed laser device when consistent with the operation thereof.

A cooling fluid 13 is pumped or otherwise forced from reservoir 14 into inlet conduit 15 which, for example, is sealed in a liquidtight relationship to windows 3 and 6 and to the supporting means (not shown) for rigidly supporting laser elements 4. Cooling fluid 13 has an index of refraction approximately the same as the index of refraction of laser elements 4. Streamline guides 16 may be positioned in close relationship with a corresponding planar member 4 to facilitate development of the desired flow of cooling fluid 13 between laser elements 4 and windows 3 and 6.

The type of fluid utilized as the cooling agent depends upon a number of factors, one of importance being the index of refraction of laser elements 4. Optimum results also depend upon the specific heat, density, thermal conductivity, and viscosity characteristics of the particular fluid coolant employed. For use in a neodymium glass laser device wherein laser elements 4 have a refractive index of 1.5, we have found that a liquid in the nature of dimethyl sulfoxide with a refractive index of 1.48 performs adequately as the cooling fluid.

After passing between laser elements 4, cooling fluid 13 flows into output conduit 17 which leads to heat exchanger 18 where the heat gained by cooling fluid 13 is removed.

The faces of the material comprising the laser medium ordinarily must be optically flat to within $1/10\lambda$ to prevent optical distortion. Any reduction in thickness of the material results in increased mechanical difficulty in maintaining the faces optically flat. Through the use of cooling fluid 13 having an approximately matching index with and flowing between laser elements 4, this requirement is greatly relaxed. Tolerances in this environment are large enough to include at least one wavelength variation in flatness in neodymium glass lasers. Such tolerances are presently commercially available on 3 in. by 3 in. by 1 mm. glass filters.

As mentioned heretofore, there is a decrease in the amount of pumping radiation absorbed when the thickness of the laser medium is decreased. This, however, does not occur in the embodiment of FIG. 1 due to the plurality of laser elements 4 present. Utilization of the laser device of our invention also allows the doping concentration and/or thickness of the different laser members 4 to be varied, thus yielding a more uniform distribution of absorbed pumping energy.

Figure 2:
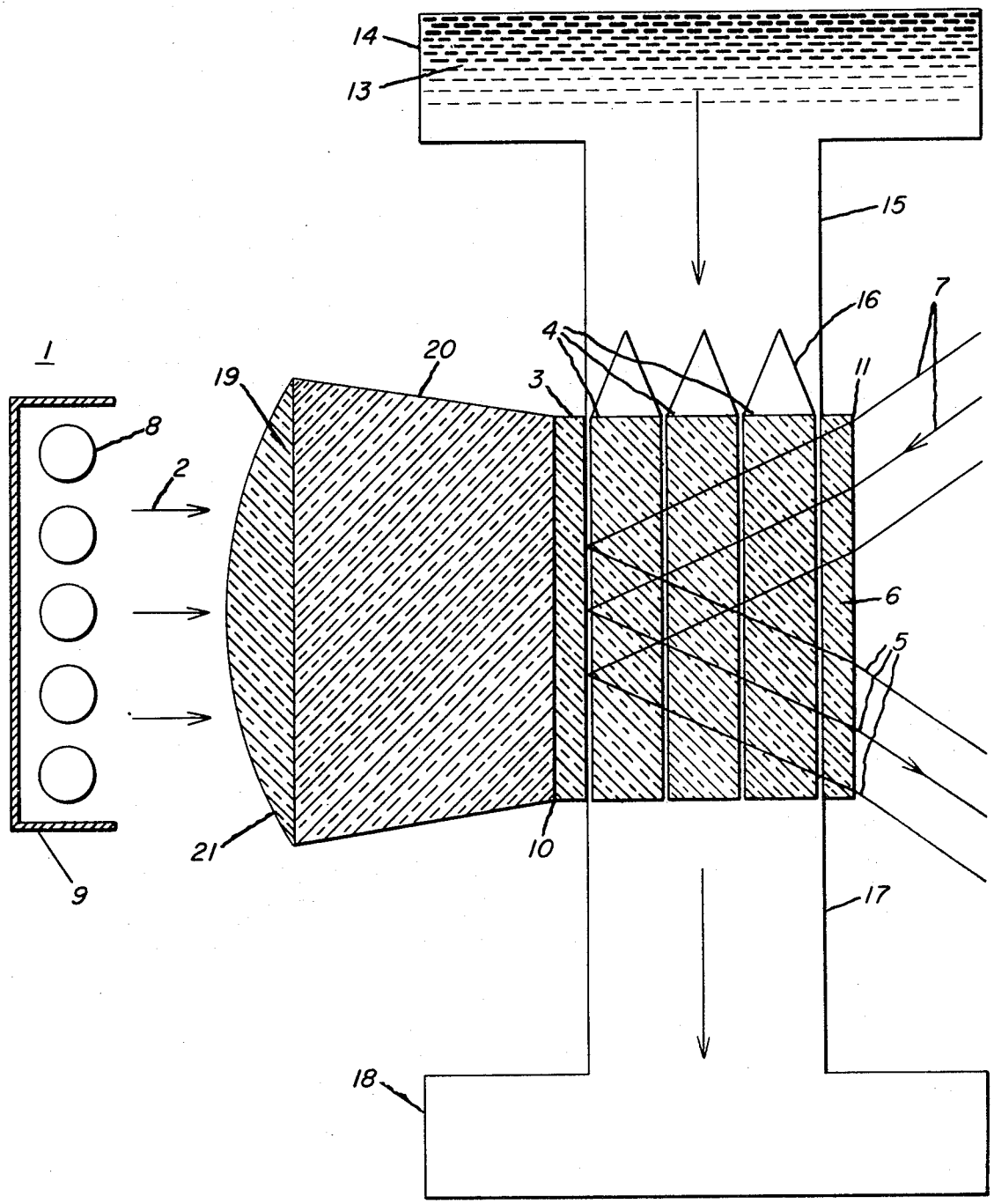
FIG. 2 is a view in vertical cross section of a face-pumped, face-cooled laser device in accordance with our invention utilizing immersion structure.

An example of a face-pumped, face-cooled laser device of our invention is shown in FIG. 2 wherein the immersion structure is of the type described and claimed in the aforementioned application of J. P. Chernoch and W. S. Martin, entitled "Apparatus for Immersion of Faced Pumped Laser Devices," Ser. No. 644,142, and incorporated by way of reference herein. As described in greater detail therein, the flux density of electromagnetic radiation from pumping means 1 may be increased by a value of approximately $n^2$ where $n$ is the index of refraction of laser elements 4.

In FIG. 2, flash lamps 8 emit electromagnetic radiation 2 of pumping wavelengths which passes through square, planoconvex member 19 selected to transmit pumping wavelengths. Solid, transparent, truncated pyramid 20 with lateral surfaces polished to optical smoothness and coated for high reflectivity has an index of refraction at least as great as that of laser elements 4. The pumping wavelengths readily pass through transparent pyramid 20 and are absorbed, as earlier described, by laser elements 4, causing population inversion therein. The laser elements 4 may be in the form of thin parallel slabs in the laser device shown in FIG. 2.

Figure 3:
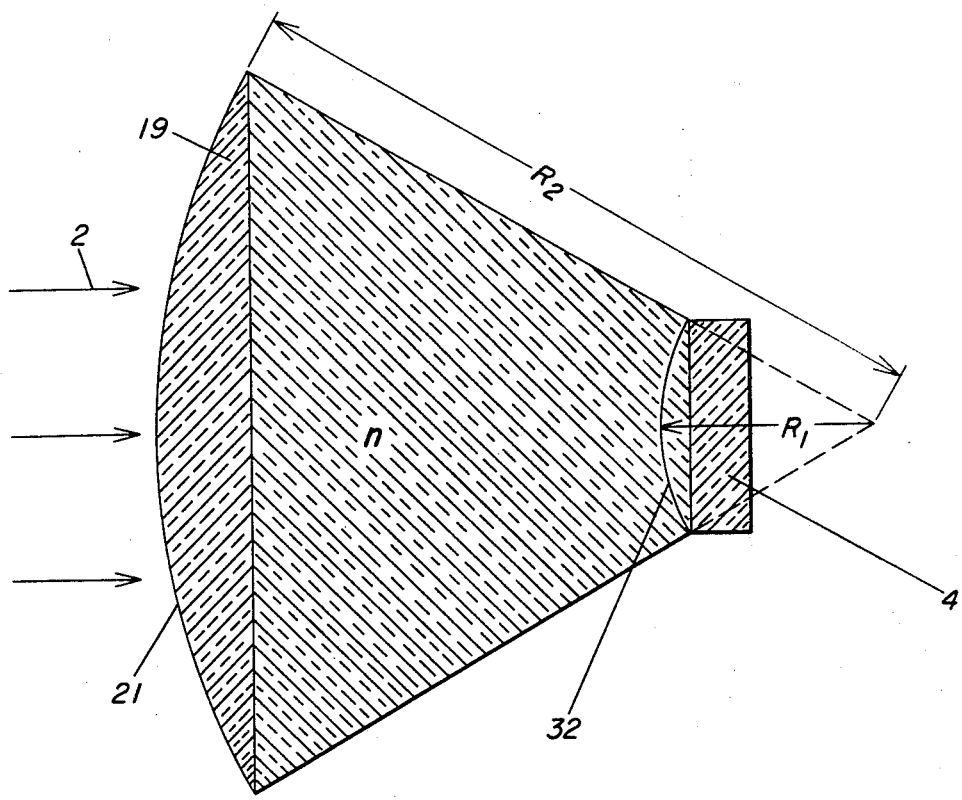
FIG. 3 is a schematic representation of the geometrical relationships utilized in operating the immersed face-pumped, face-cooled laser of FIG. 2.

Dimensionally, as best seen in FIG. 3, planoconvex member 19 is constructed in such a manner that the radius of curvature $R_2$ of surface 21 is equal to or greater than $n$ times the radius of curvature $R_1$ of a spherical surface cap 32 approximating the surface of laser element 4. The resulting flux density as described in the aforementioned application Ser. No. 644,142 is increased by a factor of approximately $n^2$. By using the geometrical relationships so established in conjunction with out present invention, as shown in FIG. 2, we have found that we are able to substantially increase the repetition rate of the immersed face-pumped laser.

From the foregoing discussion, it is apparent that the concept of a face-pumped, face-cooled laser device of our invention is not limited to those examples shown and described, but is easily implemented in any face-pumped laser arrangement wherein a higher pulse repetition rate is needed or desired. It may be readily appreciated that the cooling characteristics allowing higher pulse repetition in active laser materials with low thermal conductivities is not the only advantage thus obtained. As described hereinbefore, the face-pumped, face-cooled laser device of our present invention produces and extracts heat substantially uniformly across the aperture, thus keeping the thermal and related optical properties of the device uniform across the aperture while relaxing the flatness tolerances requirements for the faces of the laser members.

The invention having been set forth with respect to certain embodiments and examples thereof, those skilled in the art will become readily aware of the many modifications and changes obtainable in light of the disclosed descriptive matter herein. Accordingly, by the appended claims, we intend to cover all such modifications and changes as fall within the true spirit and scope of the present invention.

What we claim as new and desire to secure by Letters Patent of the United States is:

1. A laser device comprising
   a plurality of planar laser elements having a common optical axis and which are in close physical juxtaposition and have major surfaces in a substantially parallel relationship, said major surfaces having a transverse dimension larger than the distance between said major surfaces of each of said planar laser elements, said laser elements having side surfaces in substantial alignment;
   cooling means including a liquid flowing between said major surfaces of adjacent planar laser elements for cooling said major surfaces and having an index of refraction approximately the same as the index of refraction of said planar laser elements, said cooling means further including streamline guides positioned along the side surfaces of said laser elements and directed toward the flowing liquid for providing a predetermined flow of said cooling liquid between said major surfaces of said laser elements;
   pumping means positioned adjacent only one of the two outermost major surfaces of the plurality of planar laser elements for providing high intensity electromagnetic radiation of pumping wavelengths uniformly incident only on said major surfaces and being absorbed uniformly by said plurality of planar laser elements through the major surfaces thereof to provide uniform activation and concomitant heating across each laser element, said radiation of pumping wavelengths causing said laser elements to emit coherent electromagnetic radiation, said cooling means extracting heat substantially uniformly across each laser element thereby retaining uniform thermal properties across the laser elements and minimizing distortion of the emitted coherent electromagnetic radiation; and optical means positioned between said pumping means and said plurality of laser elements having the characteristic of optically transmitting electromagnetic radiation of said pumping wavelengths and reflecting said coherent electromagnetic radiation.

2. The laser device of claim 1 including conduits for providing inlet and outlet passages for said cooling liquid.

3. The laser device of claim 1 including first and second windows which are characterized by being optically transparent to said electromagnetic radiation of pumping wavelengths and to said coherent electromagnetic radiation, said first window mounted between said pumping means and said plurality of said planar laser elements, said second window mounted adjacent said plurality of planar laser elements on the side thereof opposite from said first window, said first and second windows having major surfaces in a plane substantially parallel to said major surfaces of said planar laser elements.

4. The laser device of claim 3 wherein said major surfaces of said windows adjacent said plurality of said planar members are in physical contact with said cooling liquid.

5. The laser device of claim 4 wherein said optical means is a coating of dielectric material on one of said major surfaces of said first window.

6. The laser device of claim 4 wherein said optical means comprises a coating of dielectric material on one of said major surfaces of said first window and an optical member positioned adjacent said plurality of said planar laser elements on the side thereof opposite from said first window.

7. The laser device of claim 6 wherein said coating on one of said major surface of said first window is totally reflecting to said coherent radiation and wherein said optical member is partially reflecting to said coherent radiation.

8. The laser device of claim 7 wherein said optical member is a coating of dielectric material on one of said major surfaces of said second window.

* * * * *